United States Patent
Denton et al.

(10) Patent No.: US 7,295,669 B1
(45) Date of Patent: Nov. 13, 2007

(54) CALL CENTER TELEPHONE AND DATA FLOW CONNECTION SYSTEM

(75) Inventors: Gregory A. Denton, Seattle, WA (US); Wendy S. Cook, Oakland, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/235,065

(22) Filed: Jan. 21, 1999

(51) Int. Cl.
*H04M 3/00* (2006.01)
*H04M 5/00* (2006.01)

(52) U.S. Cl. .............................. 379/265.02; 379/265.11

(58) Field of Classification Search ........... 379/265.02, 379/266.01, 212.01, 265.11, 266.04, 93.23, 379/265.01; 370/467, 352; 713/163; 709/204
See application file for complete search history.

(56) References Cited

U.S. PATENT DOCUMENTS

| | | | |
|---|---|---|---|
| 4,163,124 A | 7/1979 | Jolissaint | 179/18 D |
| 4,737,983 A | 4/1988 | Frauenthal et al. | 379/221 |
| 4,797,911 A | 1/1989 | Szlam et al. | 379/88.22 |
| 4,805,209 A * | 2/1989 | Baker et al. | 379/93.23 |
| 4,894,857 A | 1/1990 | Szlam et al. | 379/67.1 |
| 5,001,710 A | 3/1991 | Gawrys et al. | 370/110.1 |
| 5,008,930 A * | 4/1991 | Gawrys et al. | 379/265.11 |

(Continued)

FOREIGN PATENT DOCUMENTS

CA 1207414 7/1986

(Continued)

OTHER PUBLICATIONS

"Product Features," *Guide to Call Center Automation*, Brock Control Systems, Inc., Activity Managers Series™, Section 5—Company B120, p. 59, 1992.

(Continued)

*Primary Examiner*—Ahmad F. Matar
*Assistant Examiner*—Thjuan K. Addy
(74) *Attorney, Agent, or Firm*—Sheridan Ross P.C.

(57) ABSTRACT

A method and system for transferring telephone calls and data between computer programs in a call center. Flow connection modules associated with call center application programs allow data and telephone calls to be transferred from one computer program to another in the call center. The flow connection modules may be combined with a locator program such that the combination replaces the automatic call distributor ("ACD") in a call center. The flow connection modules enable development of modular call centers, allowing call center agent workstations to be easily increased or decreased. In operation, an application notifies its flow connection module that a call on a telephone in the workstation should be transferred to another application. The flow connection module establishes a data connection with a flow connection module associated with the other application. The flow connection module sends call-related data to the other flow connection module which then returns the telephone extension associated with the other application. The flow connection module requests a computer telephony interface ("CTI") link associated with a phone switch to transfer the call to the other application's telephone. The CTI link directs the phone switch to transfer the telephone call from the original application's workstation to the telephone of the other workstation. Having received notification of the transferred call, the other flow connection module informs the original flow connection module that the call has been successfully transferred, and the original flow connection module then disconnects the data connection.

53 Claims, 12 Drawing Sheets

U.S. PATENT DOCUMENTS

| | | | |
|---|---|---|---|
| 5,097,528 A | 3/1992 | Gursahaney et al. | 379/67 |
| 5,101,425 A | 3/1992 | Darland | 379/34 |
| 5,164,983 A | 11/1992 | Brown et al. | 379/265 |
| 5,185,780 A | 2/1993 | Leggett | |
| 5,210,789 A | 5/1993 | Jeffus et al. | 379/127 |
| 5,274,700 A | 12/1993 | Gechter et al. | 379/210 |
| 5,278,898 A | 1/1994 | Cambray et al. | 379/266 |
| 5,289,368 A | 2/1994 | Jordan et al. | |
| 5,325,292 A | 6/1994 | Crockett | |
| 5,335,268 A | 8/1994 | Kelly, Jr. et al. | 379/112 |
| 5,390,243 A | 2/1995 | Casselman et al. | 379/265 |
| 5,436,965 A | 7/1995 | Grossman et al. | 379/266 |
| 5,444,774 A * | 8/1995 | Friedes | |
| 5,469,503 A | 11/1995 | Butensky et al. | 379/265 |
| 5,469,504 A * | 11/1995 | Blaha | 379/265.11 |
| 5,473,773 A | 12/1995 | Aman et al. | 395/650 |
| 5,479,497 A | 12/1995 | Kovarik | 379/265 |
| 5,500,795 A | 3/1996 | Powers et al. | 364/401 |
| 5,504,894 A | 4/1996 | Ferguson et al. | 395/650 |
| 5,530,744 A | 6/1996 | Charalambous et al. | 379/265 |
| 5,537,542 A | 7/1996 | Eilert et al. | 395/184.01 |
| 5,544,232 A | 8/1996 | Baker et al. | 379/88.25 |
| 5,546,452 A | 8/1996 | Andrews et al. | 379/219 |
| 5,592,542 A | 1/1997 | Honda et al. | 379/265 |
| 5,603,029 A | 2/1997 | Aman et al. | |
| 5,611,076 A | 3/1997 | Durflinger et al. | 395/613 |
| 5,642,515 A | 6/1997 | Jones et al. | 395/727 |
| 5,655,120 A | 8/1997 | Witte et al. | |
| 5,675,739 A | 10/1997 | Eilert et al. | |
| 5,684,964 A | 11/1997 | Powers et al. | 395/211 |
| 5,689,698 A | 11/1997 | Jones et al. | 395/604 |
| 5,703,943 A | 12/1997 | Otto | 379/265.11 |
| 5,713,014 A | 1/1998 | Durflinger et al. | 395/604 |
| 5,742,675 A * | 4/1998 | Kilander et al. | 379/265.11 |
| 5,748,468 A | 5/1998 | Notenboom et al. | 364/132 |
| 5,749,079 A | 5/1998 | Yong et al. | 707/100 |
| 5,752,027 A | 5/1998 | Familiar | 395/614 |
| 5,754,639 A | 5/1998 | Flockhart et al. | 379/221 |
| 5,754,776 A * | 5/1998 | Hales et al. | 709/204 |
| 5,754,841 A | 5/1998 | Carino, Jr. | 395/603 |
| 5,757,904 A | 5/1998 | Anderson | 379/265 |
| 5,794,250 A | 8/1998 | Carino, Jr. et al. | 707/104 |
| 5,796,393 A | 8/1998 | MacNaughton et al. | 345/329 |
| 5,802,282 A * | 9/1998 | Hales et al. | 709/204 |
| 5,825,869 A | 10/1998 | Brooks et al. | 379/265 |
| 5,838,968 A | 11/1998 | Culbert | 395/674 |
| 5,864,848 A | 1/1999 | Horvitz et al. | |
| 5,881,238 A | 3/1999 | Aman et al. | 395/200.56 |
| 5,889,956 A | 3/1999 | Hauser et al. | 395/200.56 |
| 5,903,641 A | 5/1999 | Tonisson | 379/266 |
| 5,911,134 A | 6/1999 | Castonguay et al. | |
| 5,915,012 A | 6/1999 | Miloslavsky | 379/265.02 |
| 5,926,538 A | 7/1999 | Deryugin et al. | 379/265 |
| 5,930,786 A | 7/1999 | Carino, Jr. et al. | 707/4 |
| 5,937,051 A | 8/1999 | Hurd et al. | 379/212 |
| 5,937,402 A | 8/1999 | Pandiit | 707/4 |
| 5,940,496 A | 8/1999 | Gisby et al. | 379/265 |
| 5,948,065 A | 9/1999 | Eilert et al. | 709/226 |
| 5,960,073 A | 9/1999 | Kikinis et al. | 379/265 |
| 5,963,635 A | 10/1999 | Szlam et al. | 379/309 |
| 5,970,132 A * | 10/1999 | Brady | 379/212.01 |
| 5,974,135 A * | 10/1999 | Breneman et al. | |
| 5,974,462 A | 10/1999 | Aman et al. | 709/225 |
| 5,987,117 A | 11/1999 | McNeil et al. | 379/265 |
| 5,991,392 A | 11/1999 | Miloslavsky | 379/265 |
| 5,996,013 A | 11/1999 | Delp et al. | 709/226 |
| 5,999,963 A | 12/1999 | Bruno et al. | 709/104 |
| 6,011,844 A | 1/2000 | Uppaluru et al. | 379/220.01 |
| 6,038,293 A | 3/2000 | Mcnerney et al. | 379/88.19 |
| 6,041,103 A | 3/2000 | La Porta et al. | |
| 6,044,144 A | 3/2000 | Becker et al. | 379/265 |
| 6,044,355 A | 3/2000 | Crockett et al. | 705/8 |
| 6,052,685 A | 4/2000 | Eastwick et al. | |
| 6,052,723 A | 4/2000 | Ginn | 709/223 |
| 6,055,308 A | 4/2000 | Miloslavsky et al. | 379/265 |
| 6,115,462 A | 9/2000 | Servi et al. | 379/221 |
| 6,154,769 A | 11/2000 | Cherkasova et al. | 709/207 |
| 6,175,564 B1 * | 1/2001 | Miloslavsky et al. | 370/352 |
| 6,178,441 B1 | 1/2001 | Elnozahy | 709/203 |
| 6,185,292 B1 | 2/2001 | Miloslavsky | 379/265 |
| 6,215,865 B1 | 4/2001 | McCalmont | 379/212.01 |
| 6,226,377 B1 | 5/2001 | Donaghue, Jr. | 379/265 |
| 6,229,819 B1 * | 5/2001 | Darland et al. | |
| 6,230,183 B1 | 5/2001 | Yocom et al. | 709/105 |
| 6,233,333 B1 | 5/2001 | Dezonmo | 379/266 |
| 6,240,417 B1 | 5/2001 | Eastwick et al. | 710/62 |
| 6,263,359 B1 | 7/2001 | Fong et al. | 709/103 |
| 6,272,544 B1 | 8/2001 | Mullen | 709/226 |
| 6,278,777 B1 | 8/2001 | Morley | 379/265 |
| 6,356,632 B1 | 3/2002 | Foster et al. | 379/265.04 |
| 6,424,709 B1 | 7/2002 | Doyle et al. | 379/265 |
| 6,426,950 B1 * | 7/2002 | Mistry | 370/352 |
| 6,434,230 B1 | 8/2002 | Gabriel | 379/265.01 |
| 6,480,599 B1 | 11/2002 | Ainslie et al. | |
| 6,490,350 B2 | 12/2002 | McDuff et al. | 379/265.06 |
| 6,518,994 B1 | 2/2003 | Mitzka et al. | |
| 6,560,649 B1 | 5/2003 | Mullen et al. | 709/226 |
| 6,560,707 B2 * | 5/2003 | Curtis et al. | 713/163 |
| 6,650,748 B1 * | 11/2003 | Edwards et al. | 379/266.04 |

FOREIGN PATENT DOCUMENTS

| | | |
|---|---|---|
| CA | 2143198 | 1/1995 |
| CA | 2174762 | 6/1995 |
| CA | 2293425 | 12/1998 |
| EP | 412692 | 2/1991 |
| EP | 0 501 189 A2 | 9/1992 |
| EP | 0740450 A2 | 10/1996 |
| EP | 0 772 335 A2 | 5/1997 |
| EP | 0855826 A2 | 7/1998 |
| EP | 0 863 651 A2 | 9/1998 |
| EP | 0863654 A2 | 9/1998 |
| GB | 2 273 418 | 6/1994 |
| GB | 2 290 192 A | 12/1995 |
| JP | 6-28323 | 2/1994 |
| JP | 6-259386 | 9/1994 |
| JP | 8-137910 | 5/1996 |
| WO | WO 8401871 | 5/1984 |
| WO | WO 96/07141 | 3/1996 |
| WO | WO/1998/056207 | 12/1998 |

OTHER PUBLICATIONS

"Product Features," *Guide to Call Center Automation*, CRC Information Systems, Inc., Tel-ATHENA, Section 5—Company C520, p. 95, 1992.

Dawson, "NPRI's Powerguide, Software Overview" *Call Center Magazine* (Jun. 1993), p. 85.

"Applications, NPRI's Predictive Dialing Package," *Computer Technology* (Fall 1993), p. 86.

"Call Center Software You Can't Outgrow," *Telemarketing®* (Jul. 1993), p. 105.

"VAST™, Voicelink Application Software for Teleservicing®," *System Manager User's Guide*, Digital Systems (1994), pp. ii, vii-ix, 1-2, 2-41 through 2-77.

GEOTEL Communications Corporation Web site printout entitled "Intelligent CallRouter Call Flow", 1998.

GEOTEL Communications Corporation Web site Printout entitled "The Intelligent CallRouter Product Overview", Jul. 3, 1997.

GEOTEL Communications Corporation Web site printout entitled "Intelligent CallRouter Product Architecture" Jul. 3, 1997.

U.S. Appl. No. 09/247,893, filed Feb. 10, 1999, Edwards et al.

U.S. Appl. No. 09/264,497, filed Mar. 8, 1999, Edwards.

E. Gamma et al., Design Patterns: Elements of Reusable Object-Oriented Software, 1995, Addison-Wesley, One Jocod Way, Reading, Massachusetts 01867, USA, XP002354147.

Web Site Printout Entitled "GeoTel Communications Granted Patent for Intelligent Call Routing Technology", www.geotel.com/Patent.htm; [accessed Jul. 3, 1997].

Examiner's Report for Canadian Patent Application No. 2294692, mailed Feb. 25, 2002.

Examiner's Report for Canadian Patent Application No. 2294692, mailed Jul. 12, 2005.

* cited by examiner

| ADDRESS | APPLICATION |
|---------|-------------|
| Addr1 | Application 1, Workstation 120a |
| Addr2 | Application 2, Workstation 120a |
| Addr3 | Application 1, Workstation 120b |
| Addr4 | Application 3, Workstation 120a |
| Addr5 | Application 1, Workstation 120c |
| Addr6 | Application 1, Workstation 120d |
| Addr7 | Application 1, Workstation 120e |

Basic Locator

| ATTRIBUTE SET | ADDRESS | APPLICATION | STATUS |
|---|---|---|---|
| Attributes2 | Addr1 | Application 1, Workstation 120a | Available |
| Attributes2 | Addr2 | Application 2, Workstation 120c | Off-line |
| Attributes1 | Addr3 | Application 3, Workstation 120b | Busy |
| Attributes1 | Addr4 | Application 1, Workstation 120d | Available |
| Attributes3 | Addr5 | Application 2, Workstation 120b | Available |
| Attributes1 | Addr8 | Application 1, Workstation 120e | Busy |
| Attributes1 | Addr6 | Application, Workstation 120f | Busy |
| Attributes2 | Addr7 | Application 4, Workstation 120g | Available |
| Attributes2 | Addr10 | Application, Workstation 120h | Available |
| Attributes2 | Addr9 | Application, Workstation 120e | Available |

Queuing Locator

| CALLER NAME/CLIENT | PARK TIME | PARK DURATION |
|---|---|---|
| Jones – Betty's Cookies | 09:40:00 | 00:00:00 |
| Spouse | 09:39:00 | 00:01:00 |
| Smith – Am. Records | 09:38:00 | 00:02:00 |
| Irate – client unknown | 09:31:50 | 00:08:10 |
| Jefferson – Betty's Cookies | 09:31:45 | 00:08:15 |
| Walter – Ye Olde Locksmith | 09:30:15 | 00:09:45 |

*Fig. 9*

CALL CENTER TELEPHONE AND DATA FLOW CONNECTION SYSTEM

TECHNICAL FIELD

The invention relates generally to telephone call centers and, more particularly, to providing telephone and data flow connections among the call-handling applications in a call center.

BACKGROUND OF THE INVENTION

A typical call center includes a number of agents who field inbound telephone calls and place outbound telephone calls. Call center telephone calls frequently have associated data, such as customer information. An agent may place outbound sales calls or field inbound calls (such as on 800 telephone numbers) from potential customers. The agents are organized into groups, known as Skill/Split Hunt Groups.

A conventional call center typically comprises either an Automatic Call Distributor ("ACD") or Private Branch Exchange ("PBX") which receives incoming calls through a Public Switched Telephone Network ("PSTN") and routes the calls to a group of ACD agents having like skills, the Skill/Split Hunt Group, rather than to a specific agent. An ACD typically contains a superset of the functions provided by a PBX. Specialized telephones, known as ACD/PBX feature phones, interface with a specific manufacturer's ACD/PBX and provide the agents with an array of advanced telephony functions.

In recent years, call center telephony has begun moving from proprietary ACD/PBX feature phones designed for a specific ACD/PBX to software-controlled telephony applications ("Softphones") that can either co-exist with a proprietary ACD/PBX feature phone or can utilize telephone sets not necessarily designed for any particular ACD/PBX. To equip a call center with ACD/PBX proprietary feature phones typically costs three to four times as much as equipping with Softphones associated with a non-proprietary phone. In addition, the ACD/PBX itself is also quite costly. A conventional ACD/PBX call center not only requires a proprietary ACD/PBX feature phone, but also requires ACD/PBX interface line cards utilizing a proprietary protocol. Softphones provide a less expensive means for attaining many of the capabilities of an ACD/PBX feature phone while using only software in combination with a "plain-old-telephone set" ("POTS") and an associated and less expensive line card. A Softphone call center equipped with Softphones and POTS is considerably less expensive to establish and to maintain with the latest upgrades than a call center configured with ACD/PBX feature phones. A Softphone has the added advantage that persons who are not permanent call center agents may be provisioned with call center telephone capabilities without the need for an expensive upgrade to an ACD/PBX feature phone.

The software-controlled application that drives a Softphone call center generally provides the call center agent with a graphical user interface ("GUI") that replaces the function control buttons on an ACD/PBX feature phone used by the agent to control telephony functions. While interacting with a caller over the Softphone, the agent uses hot keys or an electronic mouse to select telephony functions on a workstation screen. A hot key is a keystroke or combination of keystrokes that sends a command to the computing system that provides the Softphone capability. Softphone telephony features emulate the feature buttons on an ACD/PBX feature phone and are supported via a Computer-Telephony Integration ("CTI") link to an ACD or a PBX. The CTI link allows the Softphone system to control telephone call handling operations in the ACD/PBX such as answering a call, making a call, transferring a call, and making a conference call, by sending requests and receiving event messages over the CTI link. An event message is an action or occurrence to which the Softphone may respond. Software client/server CTI Middleware products interface to the ACD/PBX proprietary CTI link and simplify the application programming interface ("API") needed by the Softphone to communicate with the ACD/PBX.

FIG. 1 illustrates a conventional Softphone-configured call center. In this Softphone call center, an ACD 102 interfaces between client telephone calls 100 and an agent telephone 108 in an agent workstation 120. The clients typically place telephone calls to the agent telephones 108 via a Public Switched Telephone Network ("PSTN") 101. When a client telephone call 100 arrives at the ACD 102, the call is received by an ACD route point 103. The PSTN calls are generally forwarded to a group of ACD agents having like skills (the ACD Skill/Split Hunt Group) rather than to a specific agent. The ACD 102 routes incoming calls through the ACD route point 103 which typically comprises a phone number in the numbering plan of the ACD 102 that works in conjunction with a routing program 104 that provides a call-handling instructions script. An ACD vector 105, typically a computer program, controls the routing program 104 to enable customized call processing specifications in the ACD 102. The routing program 104 tells the ACD's call processing software how to treat the client's call 100. The routing program 104 typically includes at least one announcement and at least one queue statement. The ACD vector 105 and the routing program 104 may be combined in some conventional ACDs. The queue statement directs the call to a specific ACD Skill/Split Hunt Group 106. The ACD Skill/Split Hunt Group 106 has a single phone number, a Pilot Directory Number ("Pilot DN") 107 that subsequently directs the client telephone call directly to one of the available agent telephones 108 within the ACD Skill/Split Hunt Group 106. As shown in FIG. 1, the ACD 102 may have multiple route points 103, multiple routing programs 104, multiple ACD vectors 105, and multiple ACD Skill/Split Hunt Groups 106. Each ACD Skill/Split Hunt Group 106 will usually include multiple agent workstations 120.

Each agent workstation 120 has an agent telephone 108 that receives calls directed to either of two numbers. The first number is the telephone number for the telephone instrument itself at the agent workstation 120, or the Phone Directory Number ("Phone DN"). The second number is a telephone number corresponding to the agent, i.e., an Agent Directory Number ("Agent DN"). The Agent DN follows an individual call center agent. Thus, the agent may switch from one agent workstation 120 to another agent workstation 120 and still retain the same Agent DN. The Agent DN constitutes a personal telephone number for the agent and returns a busy signal if the agent is not logged into the ACD 102. The Agent DN connects the call to the agent if the agent is available when the call arrives. If the agent is busy on another call, the caller hears a ringback tone until the agent is free. If the agent is not working on a particular day, or has not otherwise logged into the call center, then the Agent DN will not be active, and a party calling the Agent DN will receive a message to that effect.

A Call Control application server 110 communicates with the ACD 102 through a Computer Telephony Integration ("CTI") link 109. The Call Control application server 110 comprises a standard computing system, such as a PC, and a CTI server application which processes calling information for an agent via a Softphone application 111 in the agent workstation 120. Each agent typically has a terminal that provides a GUI to the Softphone application 111. The Softphone application 111 emulates the button functions of a conventional ACD/PBX feature phone. The Call Control application server 110 synchronizes the Softphone application 111 with the ACD 102 by sending event messages to the Softphone application 111 pertaining to the set of Agent DNs and Phone DNs that have been provided with the Softphone capability. The Call Control application server 110 services telephony commands from the Softphone application 111 to provide the agent with a Softphone. The combination of the agent workstation 120 utilizing a POTS such as the telephone 108 and the Softphone application 111 provides the agent with the features available on more expensive ACD/PBX feature phones.

A Softphone application's requirements resemble those of a robotic call-handling application. The primary difference is that the Softphone manages calls arriving at a specific Phone DN while a robotic application manages calls arriving at a specific Route Point DN. A robotic application may communicate with both the route point 103, the ACD Skill/Split Hunt Group 106, and the Agent DN and the Phone DN at the agent's workstation 120. Some robotic applications may receive information from the client calls 100 and may, in some instances, handle a call in a manner much like that of a call center agent. As robotic technologies grow more sophisticated, robotic applications may even begin replacing many, or in some instances all call center agents. A Robotic application can therefore be considered a robotic call center agent having many similar needs to a human call center agent or as a robotic application that replaces many of the aforementioned ACD capabilities. In many instances, robotic applications require capabilities beyond those required by human call center agents, such as handling many more calls than would a human agent.

While call centers equipped with Softphones have provided a degree of modularity beyond that of a conventional call center equipped with ACD/PBX feature phones, Softphone call centers nevertheless still rely upon the presence of an ACD/PBX. A conventional ACD performs important call routing tasks in the call center but does not route data, including call-related data. In some conventional call centers, a computing system external to the ACD may monitor the ACD to determine where the ACD has routed a call, e.g., an agent workstation. The external computing system may then forward call-related data to the agent workstation that received the call routed from the monitored ACD. Moreover, agent workstations do not have the ability to transfer directly messages, including calls and data, to other agent workstations. As discussed above, a conventional ACD is an inflexible and costly piece of equipment that thwarts the attainment of true modularity in call center design. Accordingly, call center design would be improved by a decreased reliance upon or outright replacement of the conventional ACD.

SUMMARY OF THE INVENTION

The invention provides a method and system for transferring telephone calls and data between computer programs in a call center. Flow connection modules associated with call center application programs allow data and telephone calls to be transferred from one computer program to another through simple programming invocation statements.

The invention also provides a method and system for routing telephone calls in a call center in such a manner so as to obviate the necessity for providing flow control in an automatic call distributor ("ACD") in the call center. The flow connection modules themselves may be arranged in such a manner so as to replace, or augment, a call center's ACD flow control tasks.

Another embodiment of the invention comprises flow connection modules, a locator program, and a private branch exchange ("PBX") that collectively replace a call center's ACD. Thus, the flow connection modules enable development of low cost, modular call centers in which call center agent workstations may be easily increased or decreased.

In operation, an application at a workstation notifies a flow object in its flow connection module that a call on a telephone in the workstation should be transferred to another application in the call center. The flow object establishes a data connection with the flow connection module associated with the other application. The flow object sends call-related data to the other flow connection module which then returns the telephone extension associated with the other application. The flow object requests a computer telephony interface ("CTI") link associated with a phone switch to transfer the call to the other application's telephone. Having received notification of the transferred call, the other flow connection module then informs the flow object that the call has been successfully transferred, and the flow object then disconnects the data connection. The other flow connection module may then provide the data associated with the phone call to the other application.

BRIEF DESCRIPTION OF THE DRAWINGS

An embodiment of the invention will be described below relative to the following figures. Note that similar elements and steps in the figures have the same reference number.

FIG. 7A illustrates an embodiment of a basic locator of the invention.

FIG. 7B illustrates an embodiment of a queuing locator of the invention.

FIG. 9 illustrates a representative display provided by an exemplary user interface associated with a call-handling application utilizing a flow connection module of FIG. 2.

DETAILED DESCRIPTION OF THE INVENTION

Embodiments of the invention provide a flow connection method and system for telephone calls and data in a call center. Flow connection, or flow control, refers to controlling the transfer of information between two points in a network, such as between two agent workstations in a call center. Call-handling applications in the call center may access an associated flow connection module that coordinates all aspects of transferring telephone calls and data to the flow connection modules respectively associated with other call-handling applications in the call center, according to an embodiment of the invention. The flow connection modules may be accessed by any application in the call center, including software-controlled telephony applications ("Softphones") utilized by call center agents and robotic call-handling applications.

The flow connection modules permit the development of modular call centers in which the number of agent workstations in the call center may be readily increased or decreased. The flow connection modules applied in conjunction with a locator program and a telephone routing switch may replace a conventional automatic call distributor ("ACD") in the call center, according to an embodiment of the invention. The flow connection modules may also be applied as an adjunct to a call center's ACD, according to another embodiment of the invention. The telephone routing switch preferably provides capabilities similar to those associated with a private branch exchange ("PBX"), such as a dial tone on receiver pickup, an ability for making calls, a ringing tone associated with inbound calls, the ability to answer calls, the ability to transfer calls, a capacity for providing an extension numbering plan, and trunk line selection.

Figure 1:
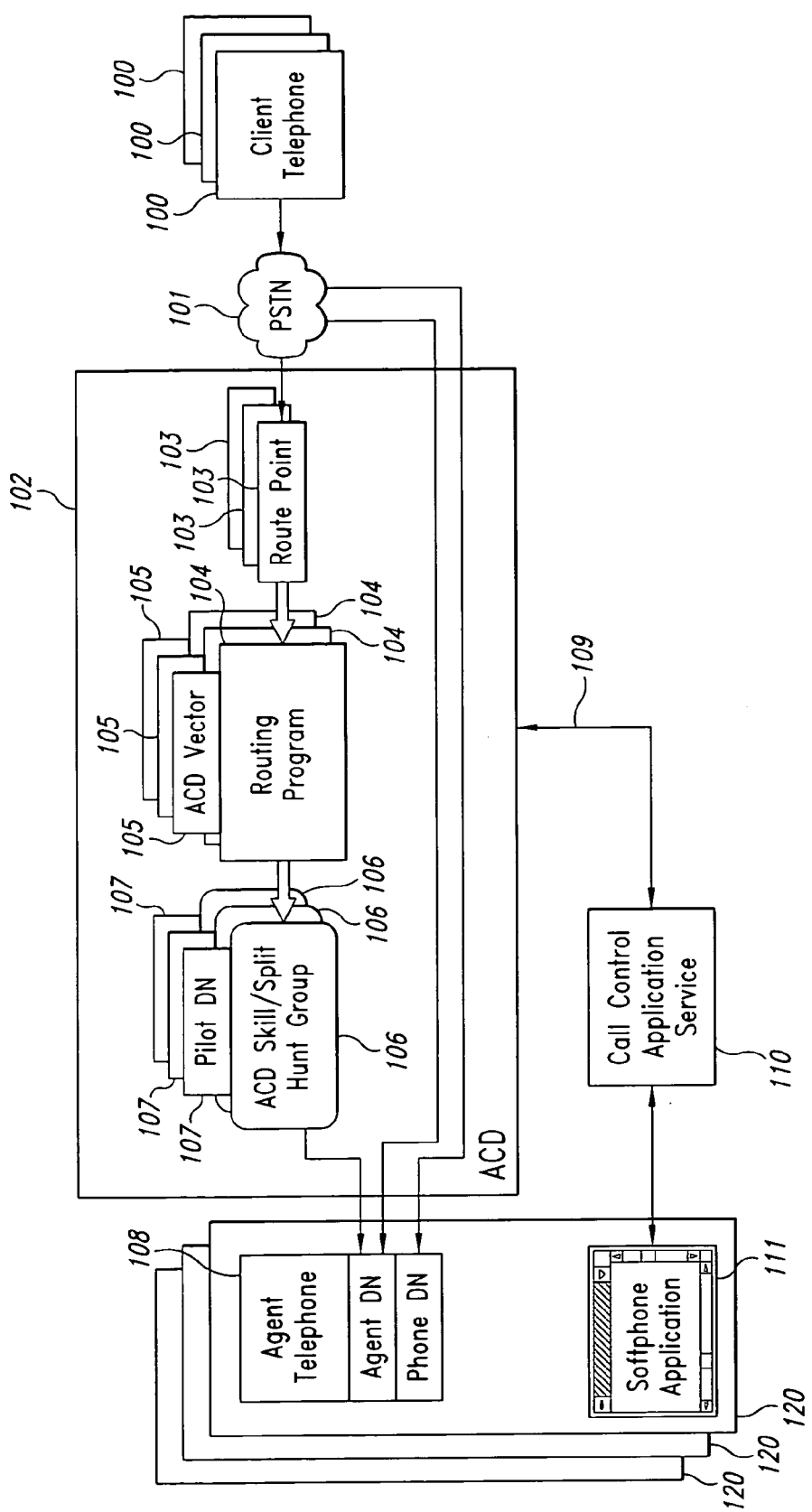
FIG. 1 illustrates a conventional Softphone-configured call center.
Figure 2:
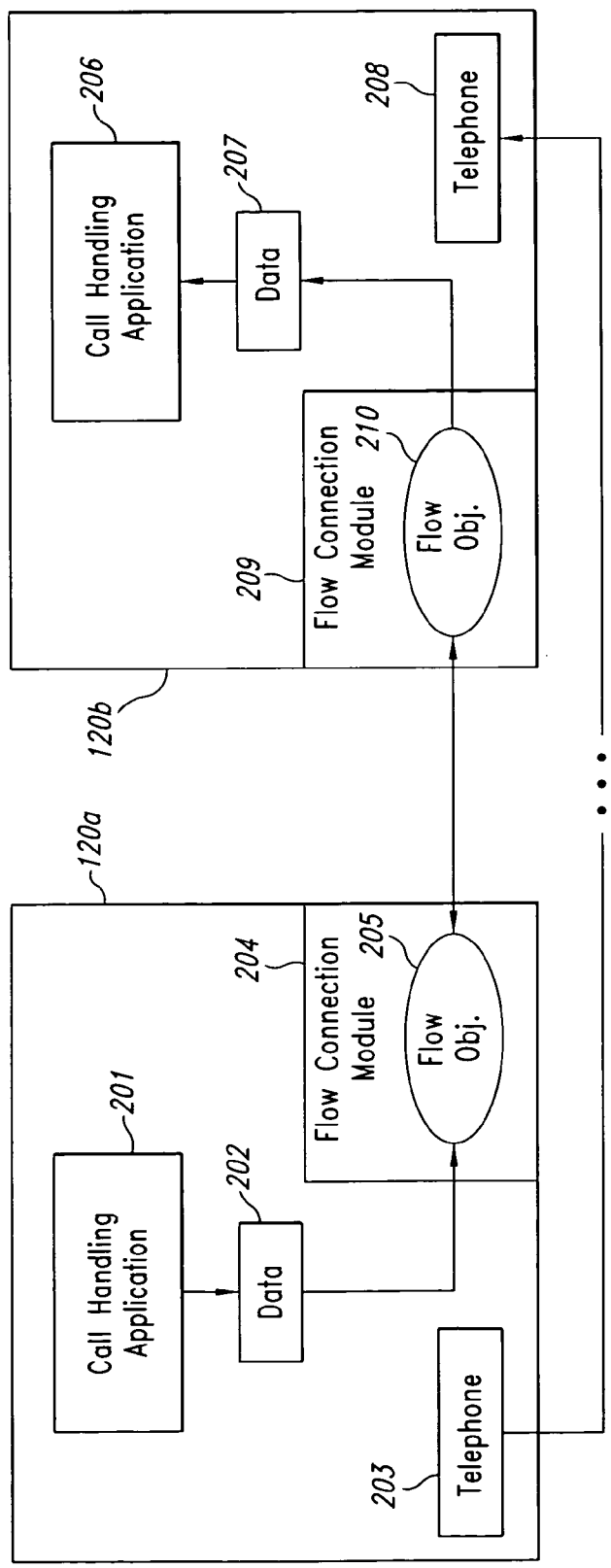
FIG. 2 illustrates an arrangement of flow connection modules for transferring telephone calls and data between applications in a call center, according to an embodiment of the invention.

FIG. 2 illustrates an arrangement of the flow connection modules for transferring telephone calls and data between applications in a call center, according to an embodiment of the invention. A call-handling application 201 in a workstation 120a processes a data set 202 in conjunction with a call on an agent telephone 203 associated with the workstation 120a. The telephone 203 contains an active connection (the call) with a customer, and the data set 202 comprises data related to the customer on the telephone 203. The call-handling application 201 begins transferring the data set 202 and the call on the telephone 203 to a call-handling application 206 on a workstation 102b by invoking a flow object 205 in a flow connection module 204 associated with the workstation 120a. An object, such as the flow object 205, comprises both routines and data that may be treated as a discrete entity in an object-oriented program. The flow object 205 receives the data set 202 along with an address for the call-handling application 206. The address may refer to a location for the call-handling application 206, an agent location identifier for a call center agent (who happens to be stationed at the call-handling application 206), and a name for a file that may receive data for the call-handling application 206. The flow object 205 establishes a data connection with a flow connection module 209 associated with the call-handling application 206. The flow connection module 209 instantiates a flow object 210, and the flow object 205 sends the data set 202 across the data connection to the flow object 210.

The flow connection module 209 sends back to the flow object 205 a phone number for an agent telephone 208 associated with the workstation 120b. The flow object 205 then transfers the call on the telephone 203 to the telephone 208 using the telephone number provided by the flow connection module 209. The flow object 205 transfers the call utilizing a phone switch (not shown) and a computer-telephony interface ("CTI") link (not shown). As discussed above, operation of the phone switch requires functionality such as that typically associated with a PBX. Once the call has been transferred, the flow connection module 209 notifies the flow object 205 of the call's transfer. The flow object 205 then disconnects the data connection with the flow connection module 209. The flow connection module 209 provides the data associated with the flow object 210 to a data set 207 associated with the call-handling application 206. The call-handling application 206 may then utilize the data set 207 in processing the transferred call now on the telephone 208. Should the call-handling application 206 need to send the data set 207 to the call-handling application 201, the procedure would be identical to the one just described albeit in a reverse order, e.g., the flow object 210 would establish a communications link with the flow connection module 204.

Figure 3:
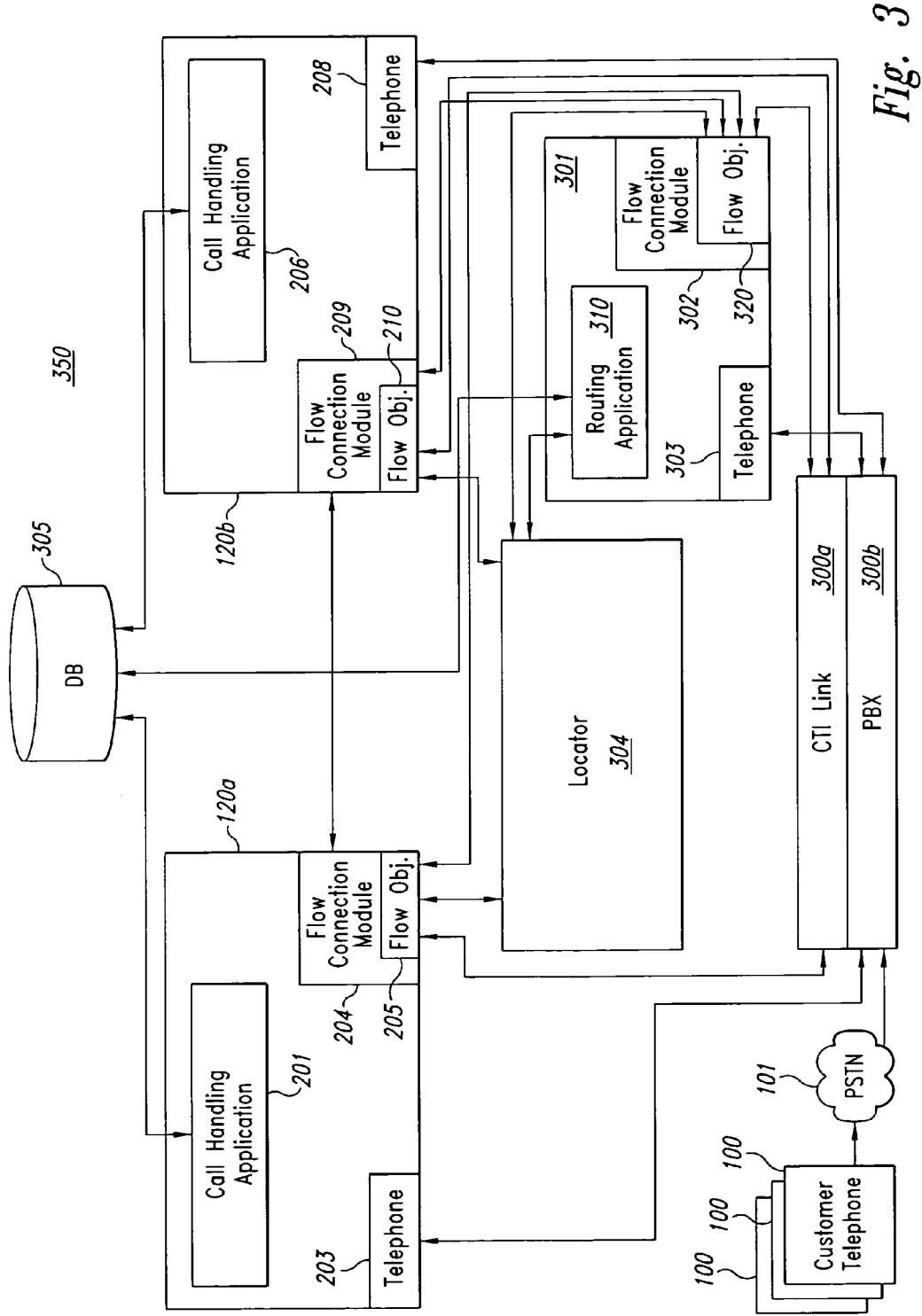
FIG. 3 illustrates an embodiment of the invention in which the flow connection modules of FIG. 2 collectively provide the functionality of a conventional ACD in a call center.

Arrangements of flow connection modules in conjunction with a locator program may provide the functionality of an ACD without requiring the complicated hardware associated with a conventional ACD, according to an embodiment of the invention. This embodiment of the invention further enables the construction of modular call centers in which agent workstations may be easily added and removed. FIG. 3 illustrates an embodiment of the invention in which the flow connection modules collectively provide the functionality of an ACD in a call center 350.

The call center 350 comprises a PBX 300b and a CTI link 300a, a call routing workstation 301, one or more agent workstations 120a, 120b, a locator 304, and a database of customer data 305. The agent workstations 120a, 120b, respectively, comprise the agent telephones 203, 208, the call-handling applications 201, 206, the flow connection modules 204, 209, and agent user interfaces (not illustrated). The agent workstations 120a, 120b may operate on personal computers, or a host/server arrangement, or in any other computing architecture that provides each call center agent with access to both a call-handling application, a flow connection module, a call center telephone, and the locator 304. The routing workstation 301 contains a routing application 310, a telephone 303, and a flow connection module 302. The telephone 303 may comprise a telephone, a telephone stub, a telephone switch, or a facility for receiving calls and parking them. The locator 304 contains a list of the active call-handling applications in the call center 350 and may also contain a list of Phone DNs and Agent DNs for the agents and telephones in the call center 350. The locator 304, as will be described below, provides a call center agent-identification functionality similar to a conventional Skill/Split Hunt Group.

A client telephone 100 places a call to the call center 350 through a public switched telephone network ("PSTN") 101. The PBX 300b receives the telephone call into the call center 350. The CTI link 300a associated with the PBX 300b initially directs the call into the telephone 303 associated with the routing workstation 301. The routing workstation 301 may be a single piece of call-processing hardware that provides the call-processing functions described herein, according to an embodiment of the invention. The routing application 310, a specialized call-handling application, determines a profile for the call, e.g., to which call center client telephone number the call was placed. The routing application 310 may also reference the database 305 containing information related to the call center client. The database 305 may also contain information related to the call, e.g., information retrieved using the caller's telephone number as a reference where caller ID is available. The routing application 310 then identifies a suitable agent workstation 120a or 120b for the call by referencing data in the locator 304. The routing application 310 accesses the locator 304 essentially to determine an appropriate Skill/Split Hunt Group identifier for the call. The routing application 310 then invokes a flow object 320 in the flow connection module 302. The flow object 320 receives as its call-related data an identifier for the call on the telephone 303 and any data retrieved by the routing application 310 from the database 305. The flow object 320 also receives a destination reference, such as a Skill/Split Hunt Group identifier, from the routing application 310 and uses the destination reference to locate a suitable and available agent workstation by querying the locator 304.

The locator 304 returns to the flow object 320 an address for a call-handling application at a suitable, available agent workstation, e.g., the workstation 120a. The locator 304 maintains information queues that relate to the various application programs available within the call center 350. The locator 304 also maintains information related to the availability of a call-handling application at an agent workstation. The locator 304 may further maintain lists of the Phone DNs and the Agent DNs for the call center's telephones, as well as any other information helpful in processing calls in the call center 350. The information queues within the locator 304 provide functionality somewhat akin to the Skill/Split Hunt Groups within a conventional ACD.

The flow object 320 establishes a data connection with the flow connection module 204 associated with the workstation 120a. The flow object 320 then sends the call-related data to the flow connection module 204 associated with the workstation 120a. The flow connection module 204 returns to the flow object 320 an identifier associated with the telephone 203 of the workstation 120a, e.g., a Phone DN. The identifier is used in transferring the call from the telephone 303 to the telephone 203.

Upon receiving the identifier, the flow object 320 sends a request to the CTI link 300a to transfer the call from the telephone 303 to the telephone 203. The CTI link 300a then notifies the flow connection module 204 of the incoming phone call to the telephone 203, and the PBX 300b transfers the call from the telephone 303 to the telephone 203. Upon receipt of the transferred call into the workstation 120a, the flow connection module 204 then notifies the flow object 320 of the phone call's transfer. The flow object 320 then disconnects its data connection with the flow connection module 204. The flow connection module 204 forwards the call-related data from the flow object 205 to the call-handling application 201 so that the agent in the workstation 120a may process the call.

If the agent determines that the call should be transferred to another agent workstation, such as the workstation 120b, then the procedure would operate in the manner described with regard to FIG. 2. Of course, incoming calls to the call center 350 may also be initially directed to the workstation 120b or other workstations (not shown), as appropriate, and will not necessarily always be assigned to the workstation 120a.

Figure 4A:
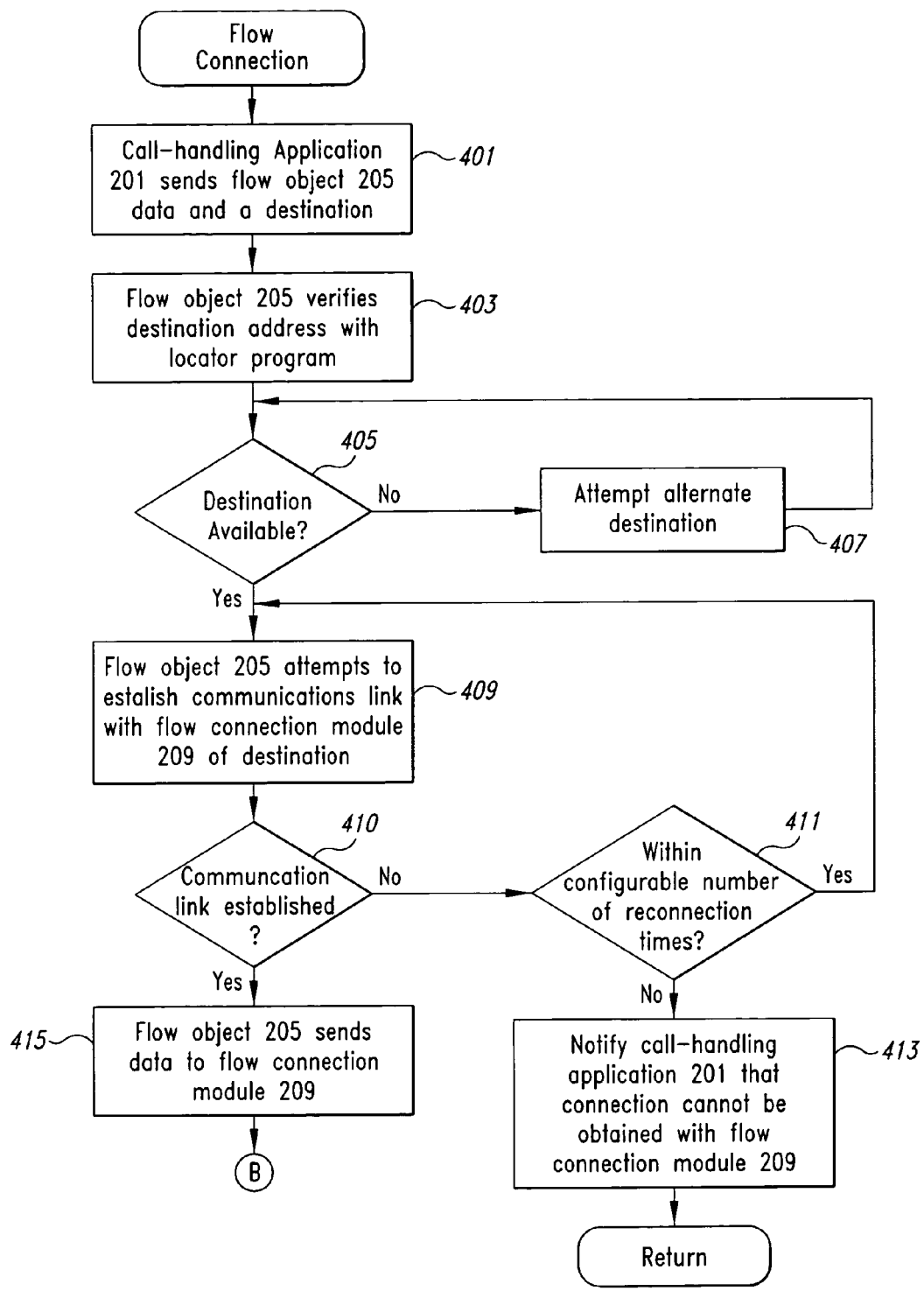
FIGS. 4A and 4B comprise a flowchart illustrating the operations of the flow connection modules shown in FIG. 2, according to an embodiment of the invention.
Figure 4B:
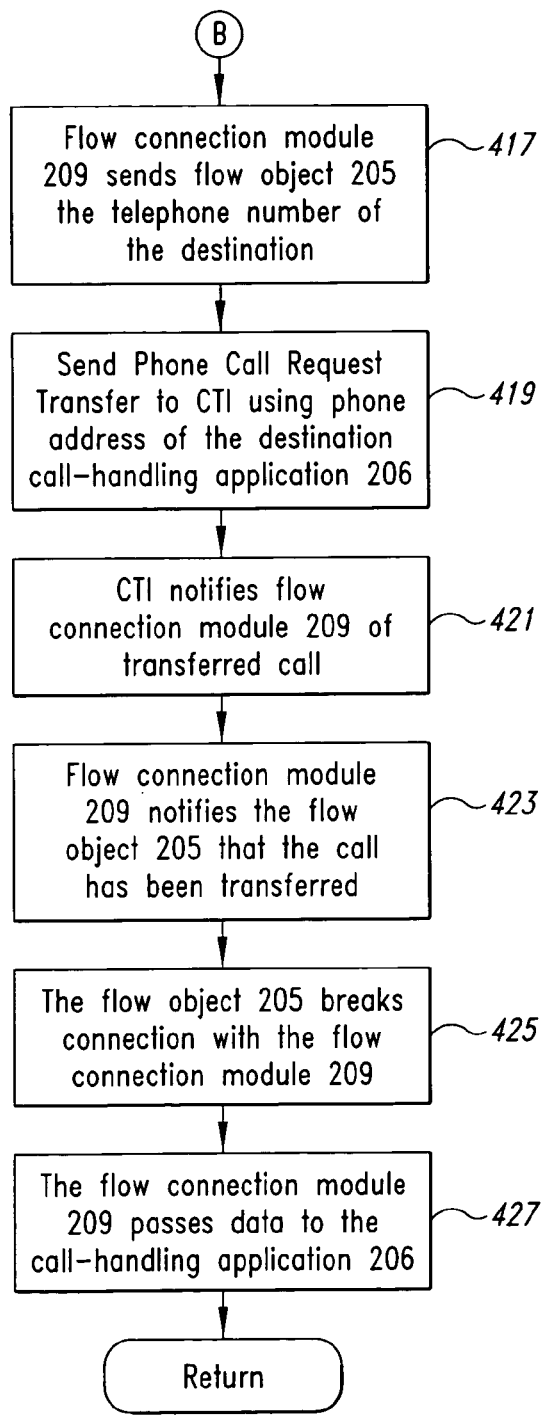

FIGS. 4A and 4B comprise a flowchart illustrating the operations of the flow connection modules, according to the embodiment of the invention shown in FIG. 2. The call-handling application 201 sends data 200 and a destination to the flow object 205 in the flow connection module 204 (step 401). The call-handling application 201 typically invokes the flow object 205 through a call statement, e.g., "Send (destination, data)." The destination, or the address, may refer to a location for the flow connection module 209, a location for the call-handling application 206, an agent location identifier for a call center agent (who happens to be stationed at the call-handling application 206) or a name for a file that may receive data for the call-handling application 206. The data 202 may include any type of call-related data.

The flow object 205 obtains the destination address with a locator program, such as the locator 304 shown in FIG. 3 (step 403). The locator program prevents the flow object 205 from transferring a call to the call-handling application 206 when it is not active, as well as preventing transfer to an incorrect application. The flow object 205 may even invoke the locator program in a loop fashion (step 405) such that if a first destination is not available, then the flow object 205 will obtain an address for an alternate destination (step 407). Once the flow object 205 has obtained a destination, then the flow object 205 may contact the flow connection module 209 associated with the call-handling application 206.

The flow object 205 then establishes a communications link with the flow connection module 209 associated with the call-handling application 206 (step 409). If the flow object 205 cannot establish a connection with the flow connection module 209 (step 410), then the flow object 205 attempts reconnection a configurable number of times (step 411). If after a configurable number of times the flow object 205 is still unable to establish a connection, then the flow object 205 notifies the call-handling application 201 that a connection cannot be obtained (step 413).

If the flow object 205 establishes a connection with the flow connection module 209 (step 410), then the flow object 205 sends the call-related data to the flow connection module 209 (step 415). The flow connection module 209 instantiates a flow object 210 and populates the flow object 210 with the received data. The flow connection module 209 sends back to the flow object 205 the actual telephone address associated with its destination (step 417). As previously noted, each telephone in a call center may have both a Phone DN and an Agent DN. If, for example, the flow connection module 210 provides an Agent DN, then the flow object 205 (or a CTI link) will need to determine the actual physical phone number (the Phone DN) associated with the flow connection module 209. The flow object 205 then sends a transfer request to the call center's CTI link requesting that the phone call associated with the call-handling application 201 be transferred a telephone associated with the call-handling application 206 (step 419). The CTI link then notifies the flow connection module 209 that a call is about to be transferred to the telephone associated with the call-handling application 206 (step 421). Using the phone number provided by the flow object 205, a phone switch transfers the call from the call-handling application's telephone in workstation 120a to the call-handling application's telephone in workstation 120b.

Once the flow connection module 209 receives confirmation that the telephone call has been transferred, then the flow connection module 209 notifies the flow object 205 of the call's receipt (step 423). The flow object 205 then disconnects its data connection with the flow connection module 209 (step 425). The flow connection module 209 transfers the data in the flow object 210 to the call-handling application 206 (step 427). The call-handling application 206 may instead invoke a request to the flow connection module 209 to receive the data of the flow object 210, e.g., "Receive (fo, data)" where "fo" is an identifier for the flow object 210. The call-handling application's request to the flow connection module 209 may be either a synchronous or an asynchronous request. Having received data from the flow object 210, the call-handling application 206 may then process the telephone call and operate on the data in its normal manner.

Figure 5:
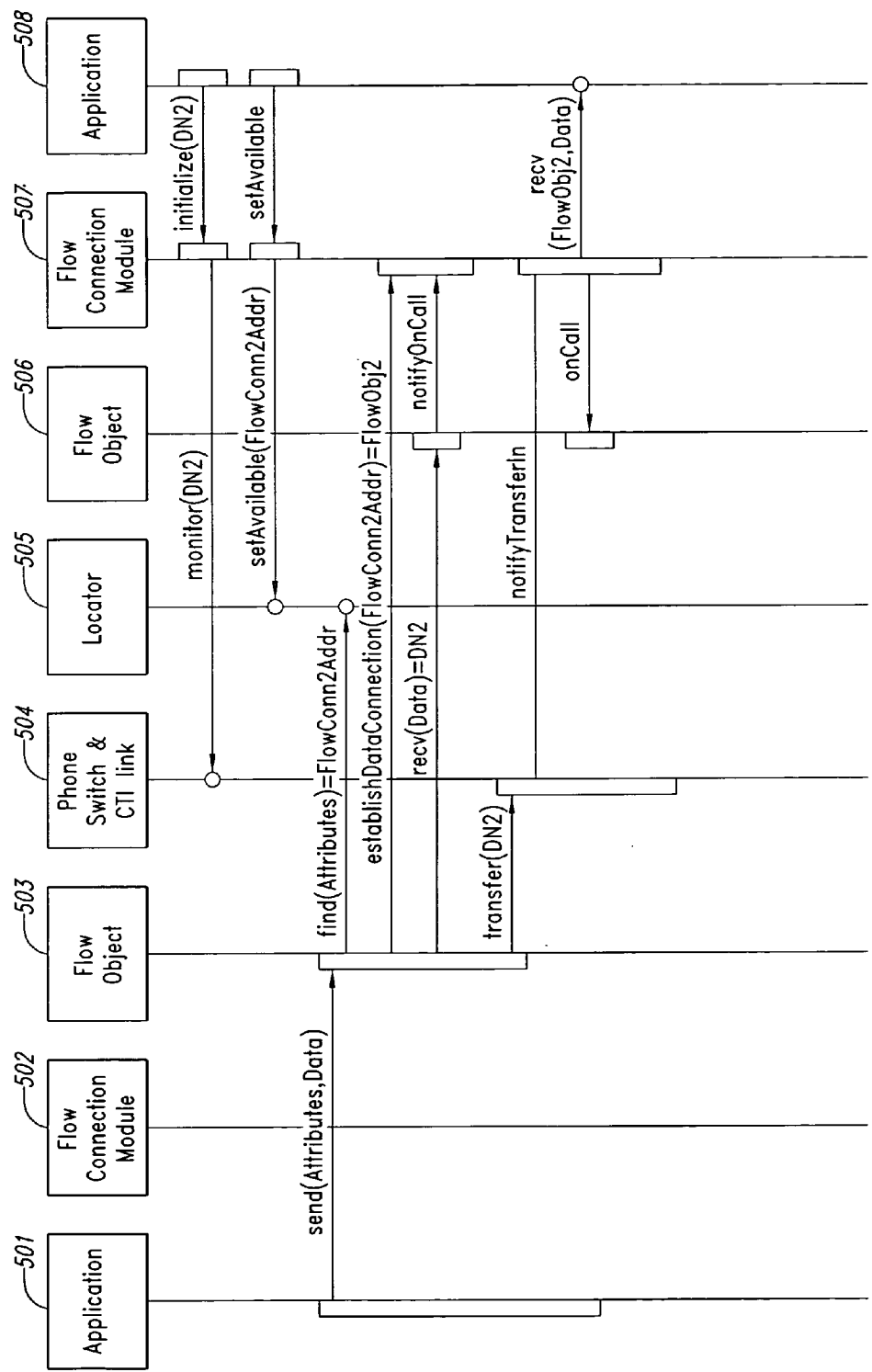
FIG. 5 illustrates programming interfaces established between various elements of a call center when using flow connection modules, such as the flow connection modules illustrated in FIG. 2.

FIG. 5 illustrates programming interfaces established between various elements of a call center when using flow connection modules, including the interfaces established when making an application available to receive calls and data through the flow connection modules and the interfaces established when transferring a call and its call-related data to another call center application.

In order to receive and transfer calls in a call center, an application must ensure that its telephone extension has been initialized. Accordingly, an application 508 begins the process of making itself available by sending a flow connection module 507 an initialization command, e.g., "initialize (DN2)." Here, DN2 is the telephone number (Phone DN) for a telephone associated with the workstation on which the application 508 resides. The flow connection module 507 then sends a "monitor(DN2)" command to a phone switch and CTI link 504. Calls arriving at the phone switch and CTI link 504 destined for an initialized extension (e.g., DN2) also cause the phone switch and CTI link 504 to send a notification to the flow connection module (e.g., the flow connection module 507) associated with the extension, in addition to transferring the call. After initialization, the conventional CTI commands are enabled, such as call transfer and call park. Call park refers to placing a call in a location where the call may be terminated, or held, and given a treatment while the call is being held. A typical treatment involves playing music or providing informational messages. The initialization procedure must occur whether the telephone line is "first party call control" or "third party call control." First party call control allows an agent to receive and transfer calls on his phone line only. Third party call control provides an agent with some control over a call even after transfer.

A locator 505 not only determines which call center applications and agents are presently active but also determines which call center agents are presently available. Accordingly, initialization of an application in an agent's workstation also requires making the application 508 known to the locator 505. The application 508 sends a "setAvailable" command to the flow connection module 507. The flow connection module 507 in turn sends a "setAvailable (FlowConn2Addr)" command to the locator 505. "FlowConn2Addr" refers to an address for the application 508, such as an address in a computing network. The "setAvailable" procedure results in the locator 505 putting the address for the application 508 into one or more of its queues.

The locator 505 may maintain multiple queues, each distinguished by its attributes. In this embodiment, the command "setAvailable(FlowConn2Addr)" provides attributes that allow the locator 505 to determine into which queue to place an address for the application 508. "Queuing" within the locator 505 provides the ACD-like operation in the call center. As previously discussed, embodiments of the invention may coordinate the transfer of a call and data associated with the call without the "queuing" procedure provided by the locator 505. In both embodiments of the locator 505, following initialization, the application 508 may utilize the flow connection module 507 to transfer and receive calls and call-related data in the call center.

Assume an application 501 wishes to transfer a call and its associated data to the application 508. The application 501 first transmits a "send(Attributes, Data)" command to a flow object 503. The flow object 503 then invokes a find command addressed to the locator 505. The find command may have the format "find( )" or the format of "find(Attributes)," depending upon whether the locator 505 is a basic locator or a queuing locator. When the flow object 503 calls the locator 505 using the "find(Attributes)" command, the locator 505 searches its queues identified by the "Attributes." If the locator 505 finds an application in the identified queue, the locator 505 copies the application's address (e.g., "FlowConn2Addr") from the queue and returns the application's address to the calling program, e.g., the flow object 503. If the locator 505 cannot find an application in the specified queue, the locator 505 then waits a configurable amount of time for the application address to appear in the queue before generating an error message.

Having received a destination address, the flow object 503 invokes an "establishDataConnection (FlowConn2Addr)" command in order to connect to the flow connection module 507. The flow connection module 507 returns to the flow object 503 an identifier ("FlowObj2") for a flow object 506. The flow object 503 then transfers the call-related data to the flow object 506. The flow object 506 in turn provides the flow object 503 with the telephone extension ("DN2") associated with the application 508. The flow object 506 then requests ("notifyonCall") that the flow connection module 507 notify it when a call has been transferred to the telephone associated with the application 508.

The flow object 503 then sends a transfer instruction ("transfer(DN2)") to the phone switch and CTI link 504 requesting that a call be transferred from the telephone associated with the application 501 to the telephone associated with the application 508. The phone switch and CTI link 504 then notifies ("notifyTransferIn") the flow connection module 507 that the phone switch and CTI link 504 is transferring a call to its associated telephone. The flow connection module 507 then notifies ("on Call") the flow object 506 that the call has been transferred, making the call's data available to the flow connection module 507. The flow object 506 notifies the flow object 503 of the call's transfer, and the flow object 503 accordingly terminates the data connection with the flow object 506. The flow connection module 507 then provides the transferred data to the application 508. As shown in FIG. 5, the application 508 has sent a command ("recv(FlowObj2,Data)") to the flow connection module 507 that causes the application 508 to wait asynchronously for the flow connection module 507 to provide the data, according to an embodiment of the invention.

A similar process would be used for transferring a call and data from the application 508 to the application 501, with a flow connection module 502 receiving the transferred data from the flow object 506. The flow connection module 502 will provide the same functionality to the flow object 503 and the application 501 as the flow connection module 507 provides to the application 508 and the flow object 506.

Figure 6:
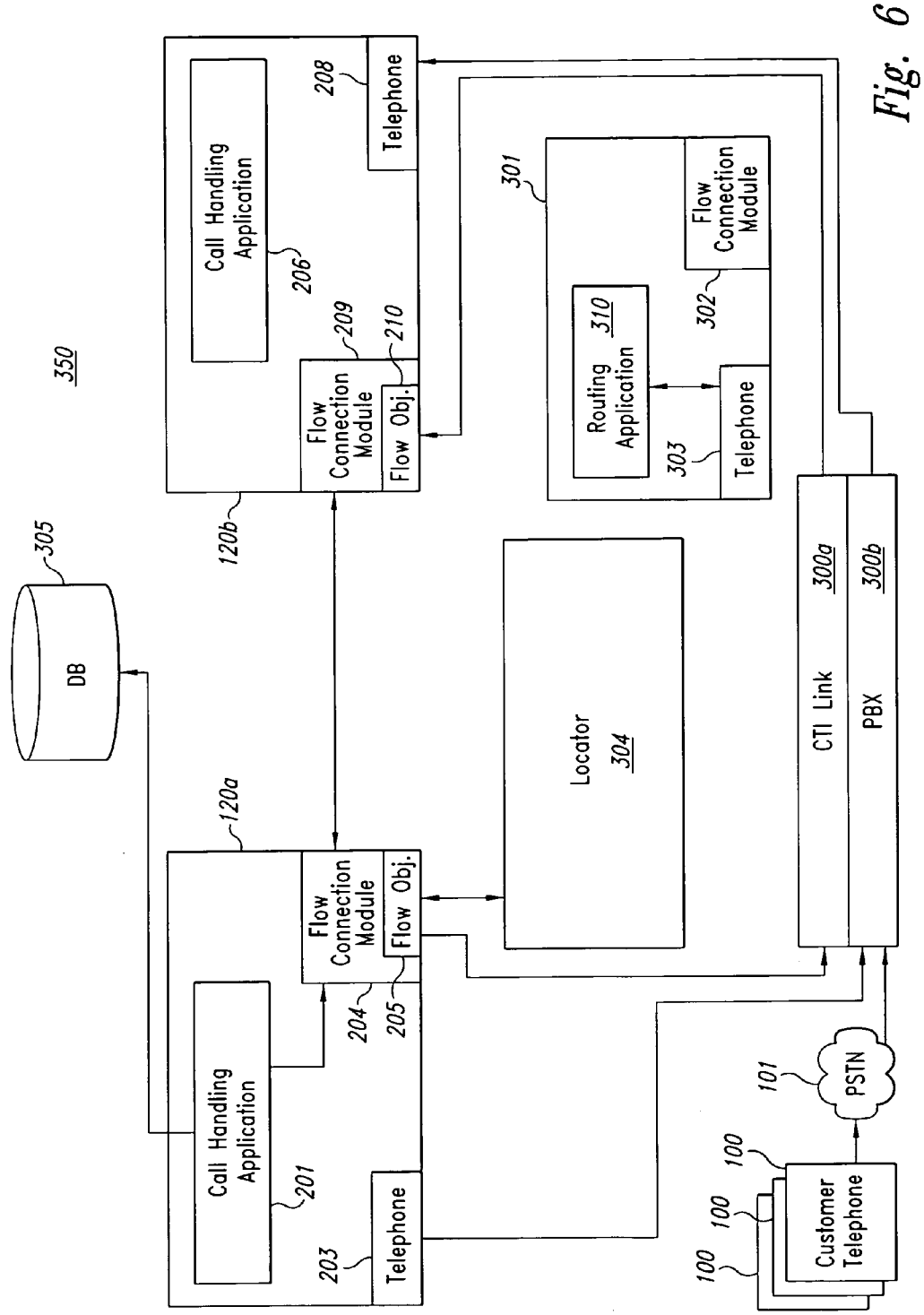
FIG. 6 illustrates the process of transferring a call from one application to another application in a call center.

FIG. 6 illustrates the process of transferring a call from one application to another application in a call center, such as the call center 350 previously shown in FIG. 3. Assume an agent associated with the workstation 120a is processing a call on the telephone 203. Using the call-handling application 201, the agent retrieves data associated with the call from the database 305. From the data retrieved for the call, the agent learns that the customer associated with the call has previously discussed the same business transaction with another agent in the call center. The agent at the workstation 120a further determines that processing of the customer's call would be expedited by reconnecting the customer with the same agent with whom the customer had previously spoken. Accordingly, the agent directs the call-handling application 201 to transfer both the call on the telephone 203 to the telephone 208 of the other agent's workstation 120*b* and to transfer the call-related data to the other agent's workstation 120*b* as well. The call-handling application 201 invokes the flow object 205 in the flow connection module 204 using a command such as "Send(destination, data)." The "destination" field is an identifier for the other agent, such as an Agent DN or Agent ID. The "data" field comprises the call-related data, such as the information retrieved from the database 305 and any other data the call-handling application 201 needs to provide to a receiving call-handling application. The flow object 205 accesses the locator 304 to identify a call-handling application at a workstation associated with the Agent DN or Agent ID provided by the call-handling application 201. The locator 304 determines that the Agent DN provided corresponds to the call-handling application 206 at the workstation 120*b*. The locator 304 also determines that the call-handling application 206 is presently active and available in the call center. The locator 304 returns an address for the call-handling application 206 to the flow object 205.

The flow object 205 contacts the flow connection module 209 associated with the call-handling application 206. The flow connection module 209 instantiates a flow object 210. The flow object 205 then transmits the data to the flow object 210. The flow object 210 sends the actual telephone number (the Phone DN) for the telephone 208 to the flow object 205. The flow object 205 then contacts the CTI link 300*a* to request transfer of the call on the telephone 203 to the telephone 208. The CTI link 300*a* contacts the flow connection module 209 to inform it that a call is about to be transferred to the telephone 208. The phone switch 300*b* then transfers the call from the telephone 203 to the telephone 208. Upon receipt of the transferred call, the flow connection module 209 notifies the flow object 210 that the transferred telephone call has been received, and the flow object 210 similarly notifies the flow object 205. The flow object 205 then disconnects its data connection with the flow object 210. The flow connection module 209 then provides the call-handling application 206 with an identifier for the flow object 210 and its associated data. The call-handling application 206 may now process the customer's call on the telephone 208 and access the data provided by the call-handling application 201.

FIGS. 7A and 7B illustrate different embodiments of the locator program, such as the locator 304 shown in FIG. 3, associated with the flow connection modules provided by the present invention. As previously discussed, embodiments of the invention are operable using two types of locators, a "basic" locator and a "queuing" locator. The basic locator does not keep track of application characteristics or availability but does provide the service of locating destination applications, e.g., by referencing a user name or some other unique property and returning an address for the destination. The queuing locator keeps track of availability and also of other destination attributes, such as those attributes previously maintained by the Skill/Split Hunt Groups.

FIG. 7A illustrates an embodiment of a basic locator 701. The basic locator 701 includes a location table 702 for the call-handling applications in the call center. The location table 702 contains a list of addresses 703 and a list of applications 704. The list of addresses 703 contains a suitable address for referencing a particular corresponding application in the list of applications 704. For example, the list of addresses 703 may contain a network address ("Addr1") for a workstation application ("application 1, workstation 120*a*"). In this embodiment of the basic locator 701, the location table 702 does not provide any information regarding the availability of the applications in the list of applications 704.

FIG. 7B illustrates an embodiment of a queuing locator 705. The queuing locator 705 includes a location table 706. The location table 706 contains an attribute set list 707, an address list 708, an application list 709 and a status list 710. The attribute set list 707 contains attribute identifiers for call center application attributes. The queuing locator 705 may contain a separate attribute classifier program for receipt and identification of attributes associated with new applications received in the call center. The attribute set list 707 performs a similar function to a conventional Skill/Split Hunt Group. For example, applications having the same attribute set (e.g. "Attributes2") may be considered to belong to the same Skill/Split Hunt Group. The address list 708 performs the same function as the list of addresses 703 in the basic locator 701. Likewise, the application list 709 performs the same function as the list of applications 704 of the basic locator 701. The status list 710 keeps track of the status for various applications in the call center. For example, the status list may keep track of whether an application is available, busy, or off-line. While an application may in some circumstances be able to hold a call, if a flow object is attempting to transfer a call to an application in a particular attribute set, the queuing locator 705 will select for the flow object an application in the attribute set list 707 that is available over one that is busy. For example, the location table 706 indicates that for a flow object seeking an application having "attributes 2,", the queuing locator 705 would select the application 1 of workstation 102*a* which is listed as "available" over the application 2 of workstation 102*c* which is listed as "off-line". Similarly, for a flow object seeking an application having "attributes 1", the queuing locator 705 would select application 1 of workstation 102*d* which is listed as "available" over the other application having "attributes 1" which are all listed as "busy".

The application list 709 may alternatively contain a list of agent identifiers or telephone identifiers. For example, the application list may alternatively contain Agent DNs instead of applications in both the basic locator 701 and the queuing locator 705. Alternatively, a locator may contain additional location tables that contain additional sets of possible identifiers or addresses. For example, a call center designer may wish to allow call center applications to transfer data and calls through the flow connection modules on the basis of attributes, application names, Agent DNs, and Phone DNs. As discussed, allowing transfer based on attributes provides functionality similar to the conventional Skill/Split Hunt Groups. Allowing transfer based on an application name or a workstation name allows a call center agent to transfer a call and data on the basis of a known application. Allowing a call center agent to transfer a call and data on the basis of an Agent DN or Agent ID permits the call center agent to transfer a telephone call and data on the basis of another call center agent's name or identification. Likewise, allowing the call center agent to transfer a telephone call and its data to a known telephone number provides the call center agent with additional flexibility.

Figure 8:
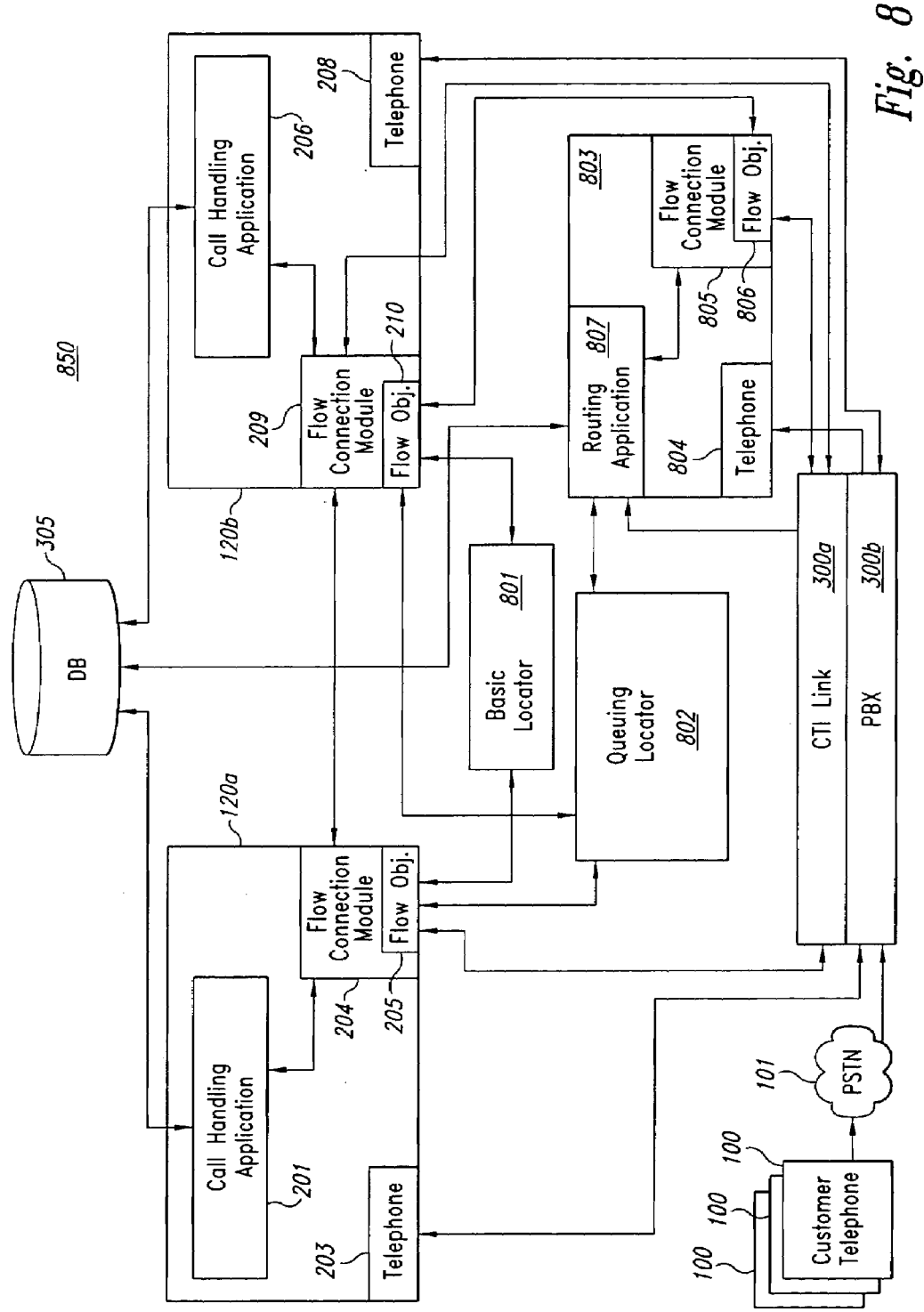
FIG. 8 illustrates another embodiment of a call center using the flow connection modules of FIG. 2.

FIG. 8 illustrates the processing of a call in a call center 850, according to another embodiment of the invention. The illustrated embodiment contains both a basic locator 801 and a queuing locator 802. The queuing locator 802 aids a routing workstation 803 in selecting an agent from a Skill/Split Hunt Group to process an incoming call. The basic locator 801 provides an expedited location service suitable for many calls passing between agent workstations.

A client telephone 100 connects to the PBX 300*b* and the CTI link 300*a*. The CTI link 300*a* directs the PBX 300*b* to transfer all initial calls into a telephone 804 associated with the routing workstation 803. The CTI link 300*a* sends a call transfer notice to a flow connection module 805, which notifies a routing application 807 of the call's arrival. Upon arrival of the call at the telephone 804, the routing application 807, a specialized call-handling application, determines an appropriate Skill/Split Hunt Group reference based upon criteria associated with the call, e.g., referencing the actual telephone number to which the call was directed with an attribute list. The routing application 807 then references the queuing locator 802 to determine an appropriate agent in the Skill/Split Hunt Group to process the call. The queuing locator 802 identifies the set of agents in the appropriate Skill/Split Hunt Group and selects one of the agents based upon criteria such as availability. If the queuing locator 802 cannot locate an available agent, then the queuing locator 802 examines a programmable range of alternatives, e.g., directing the call to a default Skill/Split Hunt Group for the same client or directing the call to a default agent workstation for the call center. Assuming the queuing locator 802 identifies a suitable agent to receive the call, the queuing locator 802 returns to the routing application 807 an appropriate identifier or address for the agent.

Depending upon its programming, the routing application 807 may retrieve client data from the database 305. The routing application 807 may also retrieve data related to the caller from the database 305, utilizing the caller's telephone number as a database key. Having received the identification for an available agent, the routing application 807 then notifies a flow object 806 of the flow connection module 805 to transfer a call, e.g., send(destination(AgentID), data). Assuming that the destination corresponds to the agent workstation 120*b*, the flow object 806 establishes a communications link with the flow connection module 209 and transmits the call-related data. The flow object 210 returns to the flow object 806 the Phone DN for the telephone 208. The flow object 806 then sends a request to the CTI link 300*a* to transfer the call from the telephone 804 to the telephone 208. Once the flow object 806 receives notification that the call has been transferred, then the flow object 806 disconnects the communications link with the flow connection module 209. The flow connection module 209 accordingly notifies the call-handling application 206 of the transferred telephone call and the receipt of data.

Assume that the agent at the workstation 120*b* now wants to transfer the call and its related data to the agent at the workstation 120*a*. Accordingly, the flow object 210 receives a destination and data from the call-handling application 206. The flow object 210 may first attempt to identify the flow connection module 204 using the basic locator 801. Under many circumstances, the basic locator 801 may provide satisfactory performance while also lessening the burden on the queuing locator 802. If the basic locator 801 returns an address for the flow connection module 204, then the flow object 210 continues to process the transaction. On the other hand, if the basic locator 801 does not provide satisfactory results, then the flow object 210 may attempt to find the destination address from using the queuing locator 802. Once the flow object 210 has received the destination address, then the flow object 210 processes the transaction in the manner previously described for the flow connection module system.

FIG. 9 illustrates a representative display provided by an exemplary user interface associated with a call-handling application utilizing a flow connection module, such as the call-handling application 201 on the workstation 120*a* shown in FIG. 2. As an example, the call-handling application may be a Softphone application. A Softphone application allows a call to be queued, parked, and held at a workstation during the call's processing. In some embodiments of the invention, a Softphone application may hold the calls within the workstation while in other embodiments, the Softphone application uses a flow connection module to park calls in an external call parking repository. The call parking repository may also have a flow connection module that returns parked calls to the call-handling application that parked them.

An agent retrieves a parked call by selecting a specific parked call from a graphical user interface ("GUI") associated with the Softphone application. This action directs the Softphone application to send a call retrieval message to its flow connection module that retrieves the call from the location at which it has been parked. A GUI 900 associated with the call-handling application, such as a Softphone application, provides a parked call identification chart 901, as shown in FIG. 9. The parked call identification chart 901 includes the name of each parked caller, the time each call was parked, and the park duration for each call. As shown in the exemplary GUI 900, the agent has parked six calls, 902-907. The call-handling application provides the agent with a utility that allows entry of the name of the parked caller. The park time and the park duration information may be automatically supplied using information provided by the call-handling application.

The agent may retrieve a specific parked call for continued processing by actuating a software radio button 908 displayed alongside each parked call such as the radio button displayed alongside the parked call 902. In one embodiment, the agent may actuate the radio button 908 by using either a combination of hot keys or by clicking on the radio button 908 using the cursor of a mouse. In another embodiment, the agent may be provided with a touch-sensitive screen and may simply touch the radio button 908.

By actuating the button 908, the agent initiates continued processing of a parked call. For example, the agent may use the button 908 to initiate transfer of the parked call to another agent workstation, using flow connection modules, or may retrieve the parked call for continued processing at his own workstation. In some embodiments, parked calls may be parked at a remote location, and the retrieval process utilizes flow connection modules to return the parked call to the agent's workstation. The agent may select any of the six parked calls 902-907 which have been previously parked. In addition, the agent may actuate the six parked call retrieval buttons 908 in any order. Thus, the agent does not necessarily have to retrieve the calls in the order in which they have been stored.

An agent using a call-handling application may also purge a parked call from the list of calls associated with the agent workstation and redirect one or more calls at the workstation to a default location using its flow connection module. Thus, a purged call is not necessarily disconnected from the call center but merely disassociated from a particular agent's workstation. The agent is also provided with a call drop button 909 which is provided alongside each of the parked calls, such as the call drop button provided alongside the parked call 902. The call drop button 909 may be selectively actuated for any of the six parked calls 902-907. For example, the agent could use the call drop button 909 associated with the caller listed as "irate." Engaging the call drop button 909 initiates the return of the parked call to a default DN, such as a default DN for the call center as specified in the locator. Depending upon the type of call and the call center configuration, this may result in redirection of the call to the agent's Skill/Split Hunt Group or to some other destination. On the other hand, if the call was directed initially to the Agent DN or to the Phone DN at the agent's workstation, then actuating the call drop button 909 could be configured to result in the call being disconnected.

Figure 10:
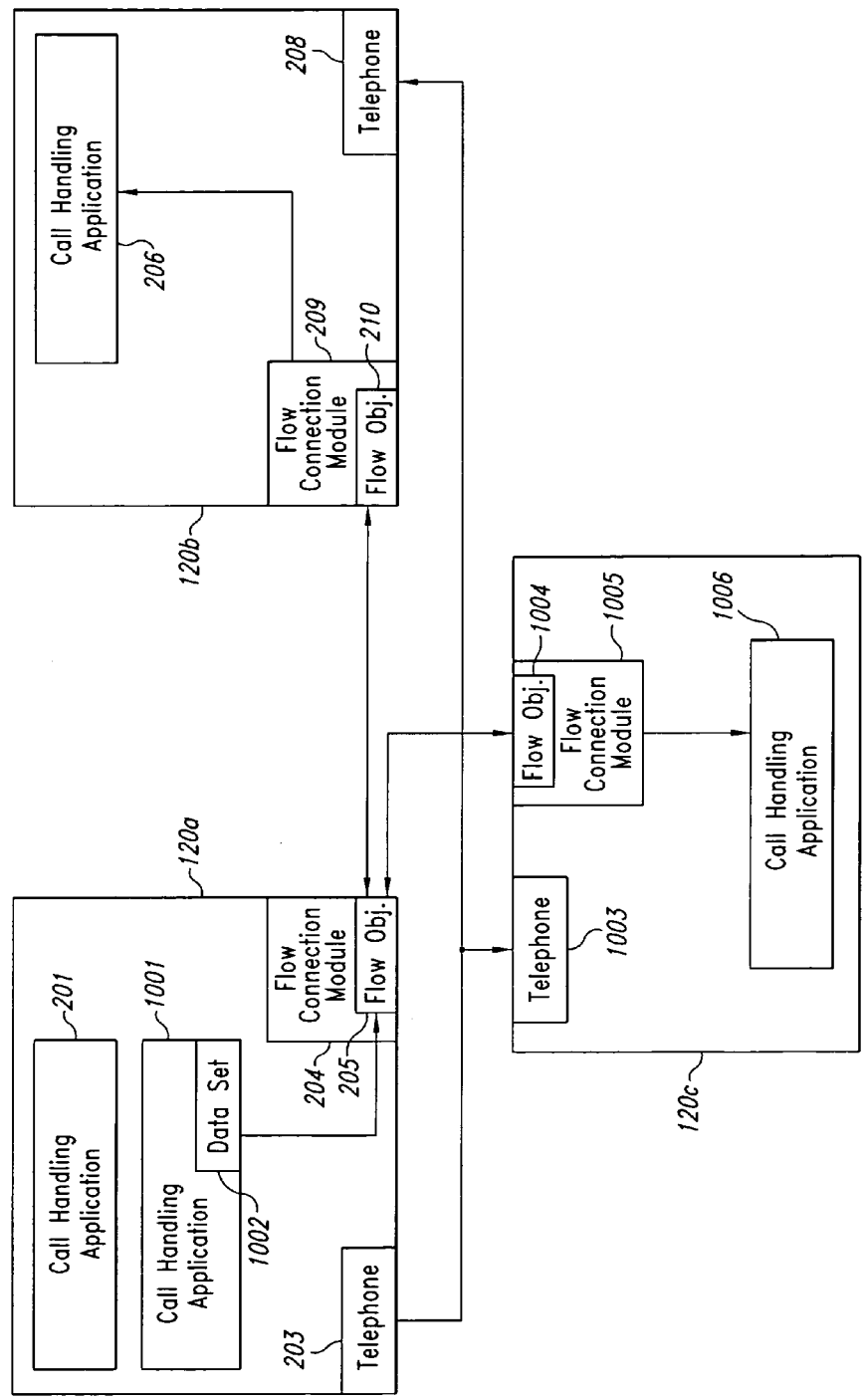
FIG. 10 illustrates two alternate embodiments of the invention in which more than one application in a workstation accesses a flow connection module and in which more than one application receives a transferred call and call-related data from a flow object.

FIG. 10 illustrates an alternate embodiment of the invention in which more than one call-handling application in a workstation accesses a flow connection module. FIG. 10 also illustrates an embodiment of the invention in which a flow connection module directs the transferring of a telephone call and call-related data to more than one workstation.

The workstations shown in FIG. 10 generally resemble the workstations shown in FIG. 2 except that the workstation 120a now contains two call-handling applications, the call-handling application 201 and the call-handling application 1001. A flow connection module may be a part of the programming of a call-handling application or may exist as a standalone program that is accessible by more than one call-handling application. For example, the call-handling application 201 may be a Softphone application that parks and retrieves calls at the workstation 120a. The call-handling application 1001 may be a specialized call-handling application, such as one associated with a particular call center client, e.g., a loan processing application for a banking client. Both the call-handling application 201 and the call-handling application 1001 may access the flow object 205 and the flow connection module 204 in processing calls, and the flow connection module 204 may pass data received from another flow object to both the call-handling application 201 and the call-handling application 1001.

The call-handling application 1001 contains a data set 1002 associated with a call on the telephone 203. The data set 1002 may contain any type of call-related data, including data retrieved from a database or data retrieved from the call itself. The call-handling application 1001 sends the data set 1002 to the flow object 205. The call-handling application 1001 has directed that the data set and call on the telephone 203 be transferred to the workstation 120b and a workstation 120c, e.g., "send(destinations, data)" where "destinations" is an array containing two destinations, the workstation 120b and the workstation 120c. Accordingly, the flow object 205 establishes a data connection with the flow connection module 209 associated with the workstation 120b and establishes another data connection with a flow connection module 1005 associated with the workstation 120c.

The flow object 205 then transmits the data set 1002 to the flow connection module 209 and the flow connection module 1005. The flow connection module 209 deposits the data with the flow object 210 while the flow connection module 1005 deposits the data with a flow object 1004. The flow object 210 returns to the flow object 205 the telephone number associated with the telephone 208 while the flow object 1004 returns to the flow object 205 the telephone number of a telephone 1003 associated with the workstation 120c. The flow object 205 then sends a request to a CTI link (not shown) requesting that the call on the telephone 203 be transferred to both the telephone 208 and the telephone 1003.

After the transfer of the call to the telephone 208, the flow object 210 notifies the flow object 205 that the call has been received, and the flow object 205 disconnects the data connection with the flow connection module 209. Similarly, once the flow object 1004 receives notification of the transfer of the call to the telephone 1003, the flow object 1004 notifies the flow object 205 of the call's receipt, and the flow object 205 disconnects its data link with the flow object 1004. The flow object 210 then makes the data set 1002 available to the call-handling application 206. Similarly, the flow object 1004 makes the data set 1002 available to a call-handling application 1006 in the workstation 120c. The agents at the workstations 120b, 120c may then process the call in a conference-like fashion.

From the foregoing it will be appreciated that, although specific embodiments of the invention have been described herein for purposes of illustration, various modifications may be made without deviating from the spirit and scope of the invention. Accordingly, the invention is not limited except as by the appended claims.

A multiple call-handling application that could be used in combination with the present invention is disclosed in U.S. patent application Ser. No. 09/060,038, "Multiple Call Handling in a Call Center," filed on Apr. 13, 1998, assigned to the Mosaix Corporation, and which is incorporated herein by reference.

While the present invention has been described with reference to preferred embodiments thereof, those skilled in the art will appreciate that various changes in form and detail may be made without departing from the intended scope of the present invention as defined in the appended claims. For example, the flow connection modules, the call-handling applications, and the workstations may differ from those shown in the figures and additional flow connection modules might be provided to support various additional functions. Workstation applications in addition to being interacted with by a human may also be interacted with by a robotic application. Accordingly, embodiments of the invention are applicable to call centers staffed entirely with human agents, call centers having hybrid robotic and human agent workstations, and call centers having completely robotic applications.

The flow connection modules may be run on different types of computing systems or on computing systems differing substantially from the computing network discussed herein. In addition, the flow connection modules within a given call center may each operate on a different type of computing system provided that the flow connection modules may ultimately perform the communications tasks described herein. The flow connection modules may be provided in microcode in a hardware device, such as that provided on a computer chip or an application specific integrated circuit ("ASIC"). The flow connection method and system may also be invoked through a specialized call center telephone such that selection, or actuation, of a button on the specialized call center telephone initiates flow connection between the telephone and its call-related data and another telephone. Similarly, the flow connection modules may also be used to transmit data without necessarily also transferring a telephone call.

In one exemplary alternative embodiment, a flow connection module may be provided as a plug-in device at a workstation. In this embodiment, a utility program could be run in the workstation to appropriately configure the workstation for operations with the plug-in device. Such a device would operate in all significant respects in the same manner as the embodiments described herein. In another embodiment of the invention, the flow connection module may be merged into the application. The flow connection modules may be programmed in any programming language. In addition, a workstation may contain more than one application that interacts with the flow connection module in the workstation. The flow connection modules may also interface with CTI middleware products, as such IBM Callpath, Genesys T-Server, or Dialogic CT-Connect.

The locator program may be configured to operate with a variety of call-directing devices. In addition, an initialization program may operate in connection with the workstations in the call center and the locator program to enter the site-specific information, such as the Agent DNs for the agents within a call center and the Phone DNs for the call center telephones. The initialization program may also allow logical functions, like the Agent DNs, to be matched to physical functions like the Phone DNs. The initialization program further assigns Agent DNs to queues in the locator program in a manner resembling Skill/Split Hunt Groups and installs the appropriate calling scripts for the Skill/Split Hunt Groups in a call routing program.

The flow connection modules may also produce an event log of the calls and data transferred into and out of one or more applications at a workstation. The log data may be stored in a data repository on the workstation or may be stored in a remote database. The log may be examined by appropriate supervisory personnel to ensure that the system is functioning within expected parameters. An abundance of erroneous transfer messages may signal an anomalous condition in the call center or in the flow connection module associated with a workstation.

If a caller hangs up while a call is being transferred through the flow connection modules, the CTI link may notify the appropriate flow connection module of this event through a call disconnected message. The flow connection module then notifies the appropriate call-handling application of the call disconnection.

In yet another embodiment, a call-handling application may direct its flow object to blind transfer a call from the telephone at the workstation to another telephone. A blind transfer is a call transfer in which the transferor indicates a transfer location for a call without checking whether the new transferred location is available. For example, in a conventional telephone system, a caller is typically placed on hold, then the transferor dials a telephone number and hits a transfer button which initiates an automatic transfer of the call. A blind transfer contrasts with a supervised transfer in which the transferor actually verifies that the transferred number is available before the call is transferred.

Although specific embodiments of, and examples for, the invention are described herein for illustrative purposes, various equivalent modifications are possible within the scope of the invention, as will be recognized by those skilled in the relevant art. The teachings provided herein of the invention can be applied to other call center designs, not necessarily the exemplary call center described above. Various exemplary computing systems, and accordingly, various other system configurations can be employed under the invention.

The embodiments of the invention disclosed herein have been discussed with regard to call center installations, such as those using large computing systems. However, the invention finds applicability in other computing systems, such as small, portable computerized systems and even de-centralized computing devices distributed in a network. The flow connection modules may be utilized for transferring data only, calls only, or even other types of connections.

These and other changes can be made to the invention in light of the above detailed description. In general, in the following claims, the terms used should not be construed to limit the invention to the specific embodiments disclosed in the specification and the claims, but should be construed to include all distributed resource allocation systems that operate under the claims. Accordingly, the invention is not limited by the disclosure, but instead its scope is to be determined by the following claims.

The invention claimed is:

1. A method of transferring a telephone call and associated data, comprising:
(a) receiving, on a first workstation that is connected to a telephone call, a request to transfer the telephone call to a destination workstation external to the first workstation;
(b) the first workstation establishing a data communications link directly between the workstation and the destination workstation;
(c) the first workstation transferring, without human intervention after receipt of the transfer request, data associated with the telephone call to the destination workstation via the communications link;
(d) the first workstation receiving directly from the destination workstation and without human intervention after receipt of the transfer request a telephone address of the destination workstation; and
(e) requesting from the first workstation that a switch external to the first workstation transfer the telephone call to the telephone address of the destination workstation.

2. The method of claim 1, wherein the destination workstation is discrete from the first workstation and wherein:
the telephone call is connected to a telephone of the first workstation; and
the telephone address is a telephone number of a telephone of the destination workstation.

3. The method of claim 1, wherein:
the destination workstation is a presently-available one of a plurality of workstations;
the first workstation queries a database for at least some of the data associated with the call;
the first work station determines, based on criteria associated with the call, a destination reference for the call and uses the destination reference in a query to a locator to select the destination workstation, the destination reference being an appropriate skill/split hunt group reference; and
the locator returning to the first workstation an address for a call handling application on the destination workstation, the data communications link being established with a flow connection module in the destination workstation.

4. The method of claim 1, wherein:
the first workstation establishing a data communications link step (b) comprises the steps of:
(B1) the first work station determines a destination reference for the call;
(B2) the first workstation using the destination reference in a query to a locator to select a data address of the destination workstation from a locator;
(B3) the locator selecting a data address of the destination workstation from one of a plurality of possible destination workstation data addresses;
(B4) the locator providing the selected data address to the first workstation; and (B5) the first workstation establishing the communications connection with the selected data address of the destination workstation.

5. The method of claim 1, wherein each of the first workstation establishing step (b) and first workstation transferring step occur at a different time than the requesting step (e).

6. The method of claim 1, wherein the first workstation establishing step (b) and first workstation transferring step (c) occur before the first workstation receiving step (d).

7. The method of claim 1, further comprising:
(f) the first workstation receiving a call transfer notification from the destination workstation; and
(g) the first workstation disconnecting the communications link with the destination workstation after receiving the call transfer notification.

8. The method of claim 1, further comprising:
(f) the first workstation determining a profile for the telephone call;
(g) a locator referencing data in a locator to determine an appropriate data address for the data associated with the telephone call; and
(h) the first workstation thereafter establishing the data communications link with the destination workstation.

9. The method of claim 1, wherein the first workstation transferring step (c) occurs after the requesting step (e).

10. The method of claim 8, wherein the locator comprises a location table containing an ordering of addresses and corresponding call handling applications.

11. The method of claim 10, wherein the location table comprises information relating to the availability of the call handling applications and an ordering of phone DNs and agent DNs associated with each call handling application.

12. The method of claim 10, wherein the location table contains an attribute set list, an address list, a call handling application list, and a status list and wherein the attribute set list contains attribute identifiers for call center application attributes.

13. The method of claim 1, wherein, in the requesting step (e), the request to transfer the telephone call is sent in a format suitable for receipt by a computer-telephone interface ("CTI") link to a private branch exchange ("PBX") and wherein the first workstation establishing step (b) comprises:
(B1) the first workstation identifying a call-handling application associated with the destination workstation; and
(B2) a locator determining whether the call-handling application is presently active.

14. The method of claim 13, further comprising:
(f) the first workstation receiving client information from a database, wherein the client information comprises the data in the transfer request.

15. The method of claim 13, wherein the data in the transfer request comprises an identifier for the telephone call.

16. The method of claim 1, wherein, when the telephone call is disconnected, a disconnect message is sent by the first workstation to the destination workstation.

17. A method of transferring a voice communication and associated data, comprising:
(a) receiving, on a first workstation that is connected to a voice communication, a request to transfer the voice communication to a second workstation different from the first workstation;
(b) the first workstation thereafter establishing, without human intervention after receipt of the transfer request, a direct data communications link between the first workstation and the second workstation;
(c) the first workstation directly transferring data associated with the voice communication to the second workstation via the communications link;
(d) the first workstation receiving from the second workstation, and without human intervention after receipt of the transfer request an electronic address of the second workstation; and
(e) requesting from the first workstation that a switch external to the first and second workstations transfer the voice communication to a telephone address of the second workstation.

18. The method of claim 17, wherein the voice communication is a telephone call, wherein the electronic address is a telephone address, and wherein:
the telephone call is connected to a first telephone of the first workstation; and
the telephone address is a telephone number of a second telephone of the second workstation.

19. The method of claim 17, wherein:
the second workstation is a presently-available one of a plurality of workstations.

20. The method of claim 17, wherein:
the first workstation establishing a direct data communications link comprises the steps of:
(B1) the first workstation retrieving from the database the data;
(B2) the first workstation requesting a data address associated with the second workstation from a locator;
(B3) the locator selecting a data address associated with the second workstation from one of a plurality of destination data addresses;
(B4) the locator providing the selected data address to the first workstation; and
(B5) the first workstation establishing the communications connection with the selected data address.

21. The method of claim 17, wherein each of the first workstation establishing step (b) and first workstation directly transferring step (c) occur at a different time than the requesting step (e).

22. The method of claim 17, wherein the first workstation establishing step (b) and first workstation directly transferring step (c) occur before the first workstation receiving step (e).

23. The method of claim 17, wherein the voice communication is a telephone call and further comprising:
(f) the first workstation receiving a call transfer notification from the second workstation; and
(g) the first workstation disconnecting the communications link with the second workstation after receiving the call transfer notification.

24. The method of claim 17, wherein the voice communication is a telephone call and further comprising:
(f) the first workstation determining a profile for the telephone call;
(g) the first workstation referencing data in a destination locator to determine an appropriate data address for the data associated with the telephone call; and
(h) the first workstation thereafter establishing the data communications link with the second workstation.

25. The method of claim 17, wherein the first workstation directly transferring step (c) occurs after the requesting step (e).

26. The method of claim 24, wherein the locator comprises a location table containing an ordering of addresses and corresponding call handling applications.

27. The method of claim 26, wherein the location table comprises information relating to the availability of the call handling applications and an ordering of phone DNs and agent DNs associated with each call handling application.

28. The method of claim 17, wherein the location table contains an attribute set list, an address list, a call handling application list, and a status list and wherein the attribute set list contains attribute identifiers for call center application attributes.

29. The method of claim 17, wherein, in the requesting step (e), the request to transfer the voice communication is sent in a format suitable for receipt by a computer-telephone interface ("CTI") link to a private branch exchange ("PBX") and wherein the first workstation establishing step (b) comprises:
   (B1) identifying a call-handling application associated with the second workstation; and
   (B2) determining whether the call-handling application is presently active.

30. The method of claim 17, further comprising:
   (f) the first workstation receiving client information from a database, wherein the client information comprises the data in the transfer request.

31. The method of claim 17, wherein the data in the transfer request comprises an identifier for the voice communication.

32. A method of transferring a voice communication and associated data, comprising:
   (a) providing a first workstation, the first workstation being connected to a voice communication, having in memory data associated with the voice communication, and being in receipt of a request to transfer the voice communication to a destination workstation external to the first workstation;
   (b) the first workstation and destination workstation establishing, without human intervention after receipt of and in response to the transfer request, a direct data communications link between the first workstation and the destination workstation;
   (c) the destination workstation receiving, from the first workstation and without human intervention after receipt of the transfer request, the data associated with the voice communication via the communications link; and
   (d) the destination workstation sending, without human intervention and after receipt of the transfer request, directly to the first workstation a telephone address of the destination workstation; the telephone address at the destination workstation being connected to the voice communication by a switch external to the first workstation.

33. The method of claim 32, wherein the destination station workstation is discrete from the first workstation and further comprising:
   (e) the first workstation requesting that the switch transfer the voice communication to the telephone address of the destination workstation.

34. The method of claim 33, wherein:
   the voice communication is a telephone call;
   the voice communication is connected to a telephone of the first workstation; and
   the telephone address is a telephone number of a telephone of the destination workstation.

35. The method of claim 33, wherein:
   the first workstation establishes the communications link with a presently-available one of a plurality of workstations and wherein the destination workstation is selected by a locator from among the plurality of workstations.

36. The method of claim 33, wherein:
   the first workstation and destination workstation establishing a data communications link step (b) comprises the steps of:
   (B1) the first workstation determining a destination reference associated with the call, the destination reference being a skill/split hunt group;
   (B2) the first workstation forwarding the destination reference to a locator;
   (B3) the locator selecting a data address of the destination workstation from one of a plurality of destination data addresses;
   (B4) the locator providing the selected data address to the first workstation; and
   (B5) the first workstation establishing the communications connection with the selected data address of the destination workstation.

37. A call center, comprising:
   at least first and second workstations;
   a data communications link directly between the at least first and second workstations; and
   a switch operable to connect a telephone call to the at least one of the first and second workstations, the at least first and second workstations being external to the switch;
   wherein, when the first workstation is connected to a telephone call, the first workstation is operable to effect the transfer of the telephone call to the second workstation by (a) transferring, without human intervention after receipt of a call transfer request from a user, data associated with the telephone call from the first workstation directly to the second workstation via the communications link; (b) without human intervention after receipt of a call transfer request from a user, to receive directly from the second workstation a telephone address of the second workstation; and (c) requesting that the switch transfer the telephone call to a telephone address of the second workstation.

38. The center of claim 37, wherein:
   the telephone call is connected to a first telephone of the first workstation; and
   the telephone address is a telephone number of a second telephone of the second workstation.

39. The center of claim 37, further comprising:
   a locator operable to select a data address of the second workstation from one of a plurality of destination data addresses and provide the selected data address to the first workstation, the address selection being based on a destination reference received from the first workstation, and wherein:
   the first workstation is operable to establish the data communications link by:
   requesting a data address of the second workstation from the locator;
   receiving the selected data address from the locator; and
   establishing the communications connection with the selected data address.

40. The center of claim 37, wherein the locator comprises a location table containing an ordering of addresses and corresponding call handling applications.

41. The center of claim 40, wherein the location table comprises information relating to the availability of the call handling applications and an ordering of phone DNs and agent DNs associated with each call handling application.

42. The center of claim 40, wherein the location table contains an attribute set list, an address list, a call handling application list, and a status list and wherein the attribute set list contains attribute identifiers for call center application attributes.

43. A call center agent workstation, comprising:
a telephone operable to receive a telephone call;
an agent interface operable to receive a request from an agent to transfer the telephone call to a destination workstation external to the agent workstation; and
a flow connection module operable, without agent intervention after receipt of the call transfer request, to (a) establish a data communications link directly between the agent workstation and the destination workstation; (b) transfer data associated with the telephone call to the destination workstation via the communications link; (c) receive directly from the destination workstation and without human intervention after receipt of the call transfer request, a telephone address of the destination workstation; and (d) request that a switch external to the destination workstation transfer the telephone call to the telephone address of the destination workstation.

44. The workstation of claim 43, wherein the agent workstation is a first workstation and the destination workstation is discrete from the first workstation and wherein:
the telephone call is connected to a telephone of the first workstation; and
the telephone address is a telephone number of a telephone of the destination workstation.

45. The workstation of claim 43, wherein:
the agent workstation identifies the destination workstation as a presently-available one of a plurality of possible destination workstations.

46. The workstation of claim 43, wherein:
the flow connection module establishes a data communications link by requesting a data address of the destination workstation from a locator and thereafter establish the communications connection with the selected data address and wherein:
the locator is operable to select the data address of the destination workstation from one of a plurality of destination data addresses and provide the flow connection module with the selected data address.

47. The workstation of claim 46, wherein the flow connection module in the first workstation is further operable to (e) determine a profile for the telephone call and wherein the locator, using information in the profile, is operable to reference data to determine the data address.

48. The workstation of claim 46, wherein the locator comprises a location table containing an ordering of addresses and corresponding call handling applications.

49. The workstation of claim 46, wherein the location table comprises information relating to the availability of the call handling applications and an ordering of phone DNs and agent DNs associated with each call handling application.

50. The workstation of claim 46, wherein the location table contains an attribute set list, an address list, a call handling application list, and a status list and wherein the attribute set list contains attribute identifiers for call center application attributes.

51. A computer readable medium comprising processor executable instructions to perform the steps of claim 1.

52. A computer readable medium comprising processor executable instructions to perform the steps of claim 17.

53. A computer readable medium comprising processor executable instructions to perform the steps of claim 32.

* * * * *